(12) United States Patent
Detela et al.

(10) Patent No.: US 9,601,957 B2
(45) Date of Patent: Mar. 21, 2017

(54) COMPACT MULTIPHASE WAVE WINDING OF A HIGH SPECIFIC TORQUE ELECTRIC MACHINE

(75) Inventors: Andrej Detela, Ljubljana (SI); Gorazd Lampic, Ljubljana (SI)

(73) Assignee: Elaphe Propulsion Technologies, Ltd., Ljubljana (SI)

( * ) Notice: Subject to any disclaimer, the term of this patent is extended or adjusted under 35 U.S.C. 154(b) by 730 days.

(21) Appl. No.: 14/009,385

(22) PCT Filed: Apr. 4, 2012

(86) PCT No.: PCT/SI2012/000022
§ 371 (c)(1),
(2), (4) Date: Jan. 29, 2014

(87) PCT Pub. No.: WO2012/138303
PCT Pub. Date: Oct. 11, 2012

(65) Prior Publication Data
US 2014/0145540 A1    May 29, 2014

(30) Foreign Application Priority Data
Apr. 5, 2011   (SI) .................. P-201100123

(51) Int. Cl.
*H02K 3/00* (2006.01)
*H02K 3/04* (2006.01)
(Continued)

(52) U.S. Cl.
CPC ........... *H02K 3/12* (2013.01); *H02K 2213/12* (2013.01)

(58) Field of Classification Search
CPC .................... H02K 1/16; H02K 3/12
(Continued)

(56) References Cited

U.S. PATENT DOCUMENTS

2003/0230949 A1* 12/2003 Ogawa ............. H02K 3/12
310/180
2004/0040142 A1* 3/2004 Hirota ............. H02K 3/12
29/596

(Continued)

FOREIGN PATENT DOCUMENTS

EP    1381140    8/2004
EP    2411774    9/2005

(Continued)

*Primary Examiner* — Jose Gonzalez Quinones
(74) *Attorney, Agent, or Firm* — MacCord Mason PLLC (57) ABSTRACT

The invention is the compact multiphase wave winding of a high specific torque electric machine The invention is the compact multiphase wave winding (6) of the electric machine. Winding (6) is filling the slots (5) of the stator ferromagnetic core (3) and comprise one or multiple layers (40). Winding (6) fills the slots (5). Winding comprise N or a multiple on N conductors (8), where N represents the number of winding phases. Conductor (8) comprises or is assembled by parallel straight segments (10) and winding overhangs (11). Between the two straight segments (10) of one conductor (8) there are N teeth (4) and N−1 slots (5) or N+1 teeth (4) and N slots (5). Straight segments are connected by winding overhangs which shape in tangential axial plane differs for less than one sixth of magnetic period (7) from ellipse shape with one axis equal to half of magnetic period (7) and other axis length between half and three quarters of magnetic period (7) length.

12 Claims, 6 Drawing Sheets (51) Int. Cl.
*H02K 3/38* (2006.01)
*H02K 3/28* (2006.01)
*H02K 3/12* (2006.01)

(58) Field of Classification Search
USPC .................. 310/180, 202–203, 205–207
See application file for complete search history.

(56) References Cited

U.S. PATENT DOCUMENTS

2006/0226727 A1  10/2006  Bramson et al. ............. 310/180
2010/0141078 A1* 6/2010  Kouda ..................... H02K 3/12
                                                310/195

FOREIGN PATENT DOCUMENTS

| EP | 1179880    | 11/2007 |
|----|------------|---------|
| EP | 2124317    | 11/2009 |
| WO | 2004/239202 | 12/2004 |
| WO | 2006065988 | 6/2006  |
| WO | 2012138303 | 4/2012  |

* cited by examiner

COMPACT MULTIPHASE WAVE WINDING OF A HIGH SPECIFIC TORQUE ELECTRIC MACHINE

The subject of the invention is the compact multiphase wave winding of an electric machine, particularly for the electric machine providing a high specific torque for a direct drive. Compact multiphase wave winding enables, besides a low mass and volume, also a high energy efficiency in high power and high torque electric machine where it can be used. The invention is useful for the propulsion of the electric cars and other vehicles, for the propulsion of the rotating machines and in a variety of other fields.

For the high torque and low energy losses of the electric machine are, among other parameters, important a high value of the ratio between the length of the active and the passive section of the winding and sufficiently large number of magnetic periods, also called pole pairs. This number is in the following text denoted by K. K of the high specific torque electric machines is usually higher than 10.

Several options for an implementation of the winding in electric machines with a high K values are known. The first option, described in patents WO 03/094328 A1 (PCT/US03/09207) and WO 05/117243 A1 (PCT/SI05/000015) is a winding with a large number of the discrete coils.

The second option is a block coil where all the coils or at least all the coils of the same phase are made as a one single continuous piece, which is inserted into the slots of the ferromagnetic core.

The first type of the block winding is a lap winding, described, for example, in the patent WO 2005/050816 A2 (PCT/CA2004/001978). Every current conductor multiple times circles a single magnetic pole before moving to the next pole.

In the second, the most usual type of the block winding, known as the wave winding, the conductor is shaped into the meanders, which wind between the magnetic poles, so that the same conductor returns to the same slot only in the next stage of the winding.

Solutions for the wave winding with a small number of electric conductors in every slot exist. In case of the patent WO/2006/110498 A1 (PCT/US2006/012914) these conductors can be cut out of the cooper sheets and can therefore have any profile shape. This patent states possible shapes for both types of the block winding: for the lap winding and for the wave winding and also for the combination of both types of winding. The mentioned patent states particularly some methods for the production of such windings out of the continuous cuts of copper.

All the existing solutions have serious deficiencies from the point of view of providing the high torque, high energy efficiency, power and other properties, and at the same time the existing motors are massive and expensive to produce.

Production and assembly of a high number of coils is time consuming and the winding with discrete coils also does not have best mechanical properties and requires a high number of electrical contacts. Also from the geometric ratios point of view of this construction does not work out properly when the value K is large.

The problem of the lap winding is also a lack of space for the crossings of the winding overhangs of the mutually adjacent or neighboring coils for the larger number of turns around every single stator tooth or the group of teeth. Additional problem is a non-destructive insertion of the conductors into the slots.

Same as for a number of other electric machines there is also a problem of crossings of the sequential winding overhangs which belong to the neighboring phases of the winding and intersect each other very closely.

Since the space in the slot is not fully filled with the conductive material the solution with larger number of thin conductors in every slot, that have to be deformed to the appropriate shape, is not optimal.

Also with the existing solutions of the wave winding with a lower number of conductors there is a problem of the neighboring winding overhangs crossings at both axial sides of the winding, so outside of the ferromagnetic core. In these two boundary zones electrical conductors are not straight and parallel, but curved. Here comes the problem that in the multiphase machines, where the conductors of several phases cross, of the lack of space for all the winding overhangs, especially in cases where the number of the layers of the winding is two or more. Also the problem of the conductors insertion order of the individual phases into the ferromagnetic core, so that the winding in which the overhangs cross ends up efficiently from the topological point of view, is not solved yet.

In each slot of the wave winding with a small number of electrical conductors the conductors are thicker and therefore the winding overhangs are not easily bent into the correct shape which would allow a tight fit of all winding overhangs. While inserting the coil into the ferromagnetic core, the winding overhangs deform into the correct shape only with significant pressure, but in such case the winding can suffer from a serious damage.

Therefore the current state of the art does not provide the satisfying solutions in the field of the electric machines yet. The goal of the invention is to design the winding which is simple to produce and allows the design of the high performance electric machine in the meaning of efficiency, torque, power and other properties at low mass and volume.

The present invention relates to an electric machine, like electric motor or generator with a large number of magnetic periods K. The invention deals with an innovative structure of the wave winding, which at the large value K provides the optimal fit of neighboring winding overhangs, so that the winding has large density, alias, is more compact and is easy to produce at the same time. Advantages of the described constructional solution are particularly high specific torque of the machine and high power, improved energy efficiency, high heat transfer coefficient, high heat conductivity from the winding to the stator core and therefore improved cooling of the machine and easy assembly process of the motor.

Compact multiphase wave winding of an electric machine with a high specific torque according to the invention is described in the following text and presented with images, which represent the implementation in the electric machine with an outer rotor. This implementation is suitable for the direct propulsion of the electric vehicles, which are an important application of the invention. Of course the invention also refers to the other implementations, versions or types of the electric machines. Constructional solutions are presented by the implementations of the machine with a radial orientation of the magnetic field, but it is obvious they can also be implemented in the constructions with a different orientation of the magnetic field.

Constructional solutions are presented by the implementation of the electric machine with permanent magnets, but it is obvious they can also be implemented in case of induction or some other kind of a machine. Constructional solutions according to the present invention can obviously be used for the linear actuators, so that the active part of the machine is outstretched into the straight section of the end length. Moreover the described topological and constructional solutions of the winding can be implemented in the stator or rotor of the motor. Due to simplicity the invention is presented for the stator winding.

Image 1: Axonometric view of the active parts of the synchronous three phase electric motor with a high specific torque (partial cross section).

Image 2: Axonometric view of the multiple winding layers.

Image 3: The shape of the single conductor at one wave winding phase.

Image 4: Scheme of the different assemblies of wave winding stacking on the circumference of the machine Image 5: One layer of the pseudo helical wave winding, the part which belongs to the one of three phases.

Image 6: One layer of the pseudo helical wave winding, which contains three electrical phases.

Image 7: Two adjacent layers of the pseudo helical wave winding.

Image 8: Four adjacent layers of the pseudo helical wave winding.

Image 9: One layer of the three phase wave winding with a deformation.

Image 10: Double layer of the helical wave winding with the shape of the knitted belt with a topological structure of a sextuple helix, for all three phases of the three phase machine.

Image 11: Wave helix winding with the shape of the sextuple helix, assembled out of the discrete sections.

Compact multiphase wave winding 6 of an electric machine with a high specific torque is shown on active parts of the synchronous electric motor. This machine has even number permanent magnets 2 on the rotor iron 1. Magnets are magnetized in the radial direction and the magnetization orientation is alternating in tangential direction. Magnetic flux is transferred trough stator ferromagnetic core 3, which is made of magnetic steel or any other material with high permeability. The number of teeth 4 and slots 5 is for less than 4 different to 2 times the number of phases multiplied by the number of magnetic periods K. The slot 5 width on the side facing the magnet 2 has at least the width of conductors 8.

There is a winding 6 in the slots 5 and the winding comprises of one or multiple layers 40. The winding 6 comprise N or the multiple of N conductors 8, which are filling the slots 5 and where N represents the number of phases. Each conductor 8 comprises of parallel straight segments 10 and winding overhangs 11. The straight segments 10 are of equal length and there are N teeth 4 and N−1 slots 5 between the two neighboring straight segments 10 of the same phase. The straight segments 10 are connected by winding overhangs 11, which shape in tangential axial plane differs for less than one sixth of magnetic period 7 from ellipse shape with one axis equal to half of the magnetic period 7 and other axis length between half and three quarters of the magnetic period 7 length. The shape of the winding overhang 11 can therefore be of isosceles triangular or semicircular shape. Most of the conductor 8 straight segment 10 is inside the stator ferromagnetic core 3. The tips of the winding overhangs 11 are for less than for the length of magnetic period away from the stator ferromagnetic core 1. Between the ferromagnetic core and winding overhang, there can be a short segment of curved conductor 8 in order to prevent the electrical surge between the winding 6 and stator core.

Figure 1:
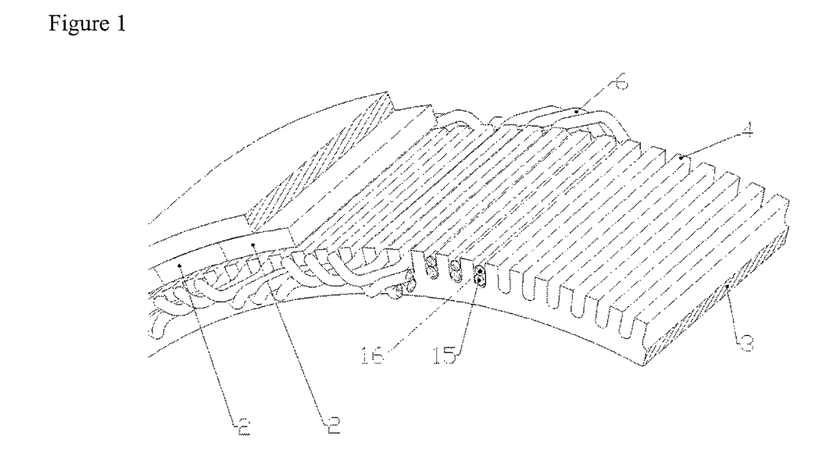
Figure 2:
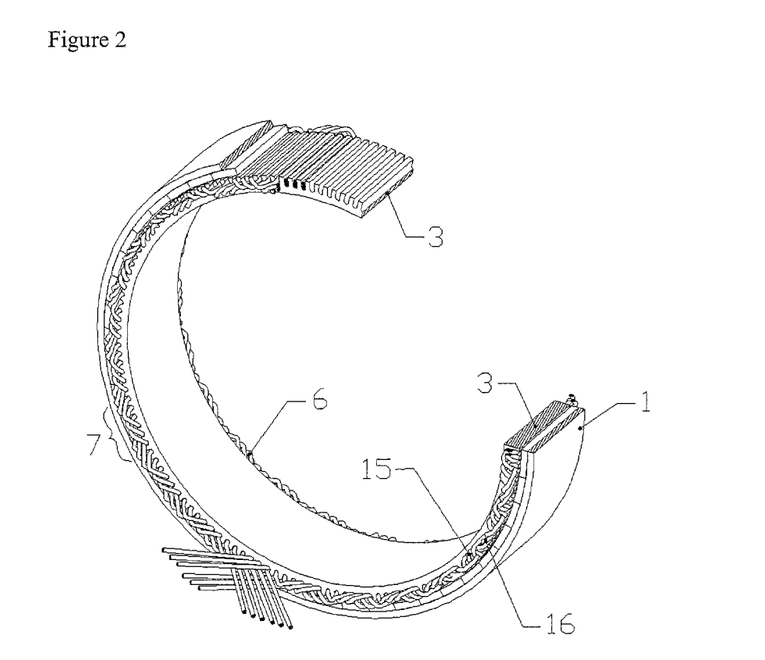
Figure 3:
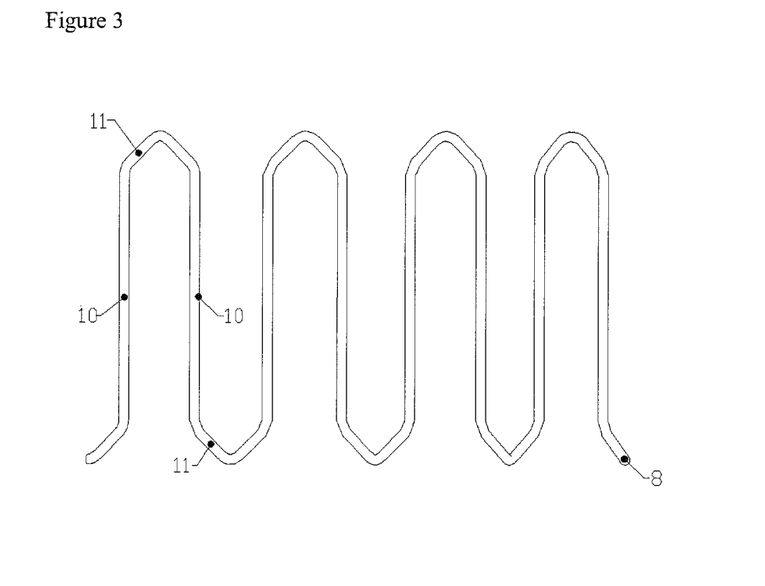

In a three phase type of the winding as shown on FIG. 1, there are six stator teeth 4 and six stator slots 5 per magnetic period 7, so that the distance between middle of neighboring slots 5 is p/6. In the following text also the exceptions, so called irregular periods are described. They may differ in terms of the slot 5 or teeth 4 number or in their tangential lengths.

Figure 4:
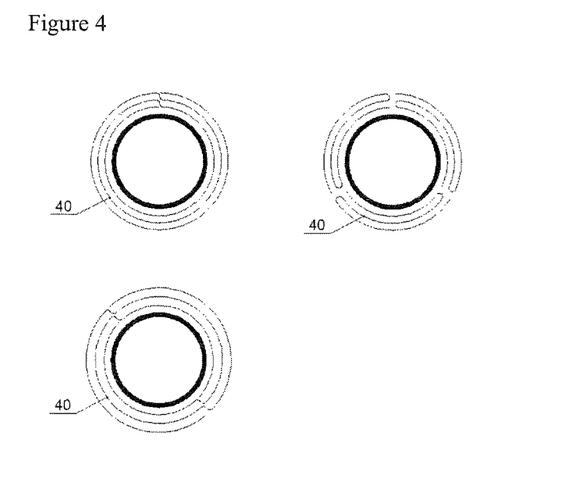

Conductors 8 are shaped in wave winding form and comprise of straight segments 10 and winding overhangs 11. The straight segments are in stator slots 5, and in each winding overhang the conductor proceeds for half of the magnetic period 7 in the tangential direction. The compact multiphase wave winding 6 can comprise of more than one layer. They can be stacked one after another around the whole circumference of the machine in a radial direction or just on its segments or in a combination as shown on FIG. 4. Radial transition between the individual layers 40 can be accomplished in such a way that the series of straight segments 10 and winding overhangs 11 of the conductor 8 proceeds in the same or in the opposite tangential direction. Layers 40 can be also intertwined.

Optimal magnetic period 7 length is p and it approximately equals the value $2\pi\sqrt{(gs)}$, where g is the radial wave winding dimension and s is the radial thickness of rotor magnets. With such parameters the specific torque is the greatest. At the large K value the magnet period 7 length p is small, therefore also the dimensions g and/or s are small. That means the motor is light and the demand for the material for the stator winding and the rotor magnets is low.

Figures show the solutions for the case of the three phase motor and the analog solutions are suitable also for all the other multiphase motors, such as five phase motor where there are ten teeth 5 and ten slots 5 per every magnetic period 7.

The winding 6 comprises conductors 8, which cross section can be circular, rectangular or any other cross section wherein a conductor 8 can comprise many thin wires or a solid slot solution. Copper or any other material with good electrical conductivity can be used. The high filling factor enables good thermal contacts and lower electrical resistance. The conductor 8 height and width represent the conductor thickness in radial and tangential or axial dimension. In the case of circular or square cross section, the width and height are the same.

Each phase can comprise M conductors in tangential sequence. M is a prime number. If M is larger than 1, than the winding topology is the same as the one of the winding of M times N phases and the number of stator slots 5 and stator teeth 4 in one magnet period is at most for one different from 2M N.

The motor can also have some irregular magnetic periods, which are used in order to reduce torque ripple and cogging torque. The stator ferromagnetic core 3 there are up to 2N additional empty or partly empty slots 5 and teeth 4 or up to 2N slots 5 and teeth 4 differ from others in tangential width for at most p/2. Also the winding is slightly different in these irregular magnetic periods. Some of the winding overhangs are longer in tangential dimension for approximately one sixth of the magnetic period 7 length.

The compact multiphase wave winding by the invention can be designed by three similar topological structures. We name them pseudo-helical, helical and deformed winding. They differ in radial deformations of winding overhangs and in placement of conductors in the slots.

Figure 5:
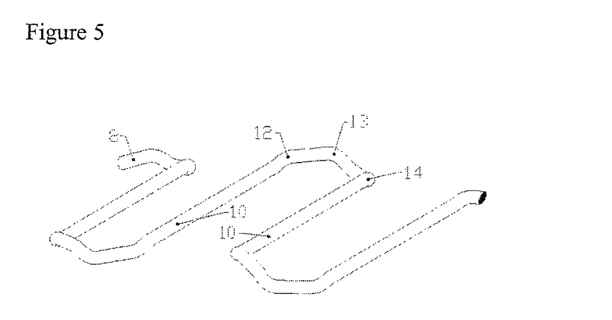

At the pseudo helical topological structure the winding overhangs 11 are at their beginning 12 and their end 14 deformed into one radial direction and in the middle 13 of it into the opposite radial direction. At the beginning of the winding overhang 12 the conducting material is deformed for approximately half of the conductor 8 height into one radial direction, than for approximately the height of the conductor 8 into the opposite radial direction in the middle of the winding overhang 13 and again for approximately half of the conductor 8 height into the initial radial direction. This is shown on FIG. 5. In this way the two neighboring parallel straight segments 10 of the conductor 8 lay at approximately the same radial position. With these radial deformations the passing of all winding overhangs is possible in small volume of space. The sum of radial deformations at the beginning 12 and the end 14 is approximately the conductor 8 height, but it is not necessary that the both deformations are equal. In the extreme case, one can be zero and the other for full conductor 8 height.

Figure 6:
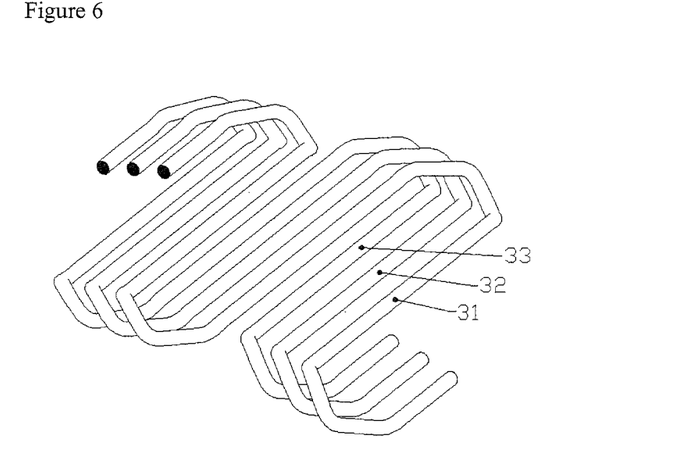

In one layer 40 of the winding 6 the N tangentially in series winding overhangs 11 are lying on one axial side of the motor and the next N winding overhangs on the other axial side of the motor like it is shown in FIG. 6. On the same axial side, the winding overhangs 11 of N tangentially in series conductors 8 are curved into one tangential directions after leaving the slots and the next N conductors 8 in series are curved into the opposite tangential direction.

One layer 40 of three phase winding 6 comprises three similar coils 3, these are the first coil 31, the second coil 32 and the third coil 33 where each of them is a part of one motor phase. Phases are tangentially in series in slots 5 like shown in FIG. 6.

Inserting into slots 5 can be done by inserting each coil 30 separately or all of them together. When inserting coils a suitable order has to be considered. In case of winding 6 on FIG. 5 the correct inserting order is the third coil 33, then the second coil 32 and at the end the first coil 31.

The layers 40 are arranged in such a way that winding overhangs 11 of the radial neighboring layers 40 are positioned at the opposite axial sides.

Figure 7:
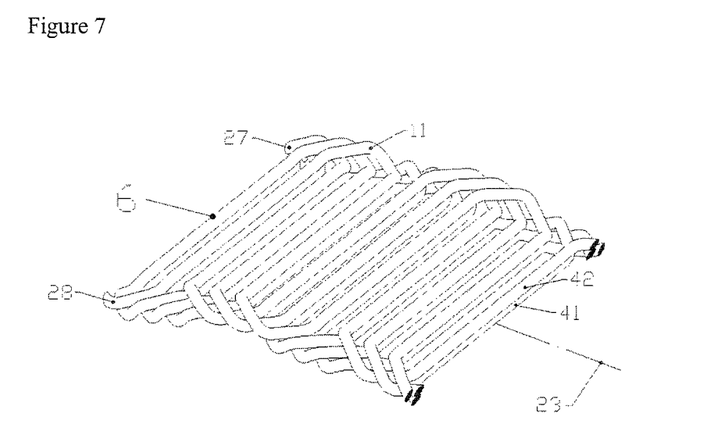

The motor can comprise only one layer 40 of winding 6 or more of them. FIG. 7 is showing the two layer 40 winding 6 and the active motor parts of such a winding are shown in FIG. 1. The second layer 42 of the winding 6 is by the shape similar to the first layer 41, which is in this case described as layer 40, with the difference of being rotated by 180° around the line 23. This is why there are left helical curves on one edge 27 in the second layer and right helical turns in winding overhangs 11 of the first layer 41. On the other edge 28 there are right helical turns in the second layer 42 and left helical turns in the first layer 41. Due to the mentioned 180° rotation the winding overhangs of the two neighboring layers 40 are displaced by half of the magnetic period 7. In this way the winding overhangs 11 fill the space in very efficient way and the winding 6 is compact.

Figure 8:
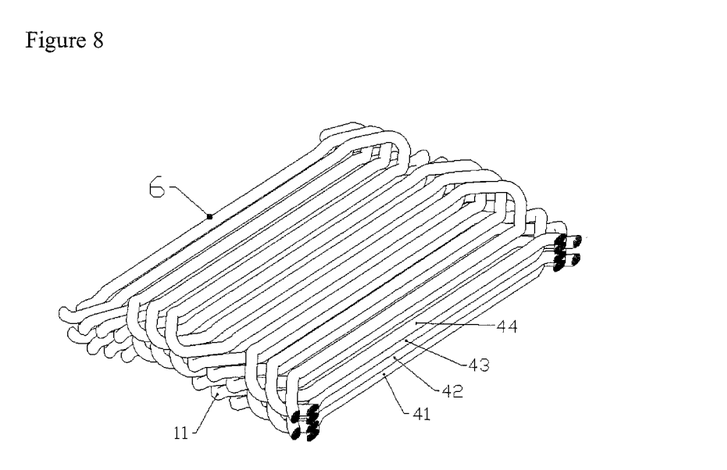

The FIG. 8 shows the winding 6 with four layers 40. The third layer 43 is similar to the first layer 41 with the difference that it is positioned at different radial dimension away from the axis. The fourth layer 44 is similar to the second layer 42. By such extrapolation there can be more than four layers 40. The similarities of the layers 40 are alternating. With such layer 40 positions and shapes the most space is used and winding 6 is compact.

By this invention the winding 6 can be produced from only three conductors 8 from which the coils 30 are made as with one conductor per coil or from more than one segments of conductors per coil. At the winding insertion process of the individual coils and at the transition between the individual layers 40 previously described irregular slots can help. In the deformed compact multiphase winding the winding overhangs are deformed on the first and on the second half. The deformation can be of different nature such as kneaded, whetted, compressed, slightly torn or deformed in other way.

Figure 9:
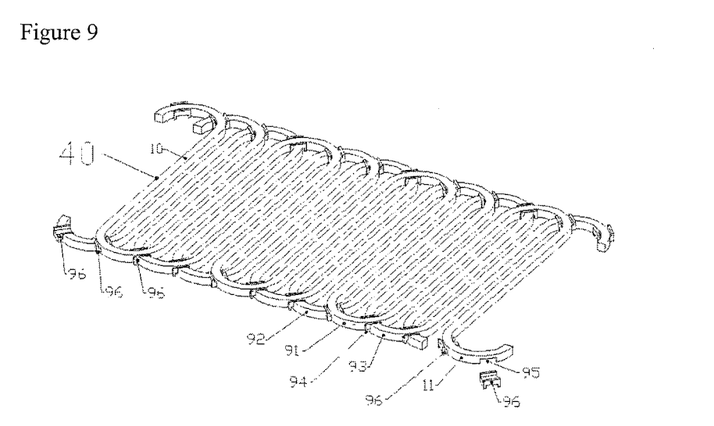

One of the possibilities for the topology of the deformed wave winding by the invention is shown in FIG. 9 which is showing also the crossing of the conductors 8. In the area of winding overhang 11 there are two caverns 95, which enable the possibility of conductor 8 crossings in the area of crossings point 94 without the requirement for larger consumption of space even if there are three conductors 8 of one layer 40 laying at similar radial distances in stator slots 5. At the crossing point 94 there is additional electrical insulation layer 96 between the conductors 8.

In the case of three phase machine, one layer 40 of the deformed compact winding comprises three wave shaped conductors 8. In the figure, these are the conductors 8 of all three phases, namely the first phase conductor 91, the second phase conductor 92, the third phase conductor 93. The neighboring conductors, for examples conductor of the first phase 91 and conductor of the third phase 93, which lay in the neighboring slots 5 in the same layer 40, cross each other close to the slots 5 at the crossing point 94, which is close to the beginning or the end of the winding overhang 11. In each layer 40 of the winding 6, the winding overhangs 11 of the pair of tangentially in series conductors 8 on the same axial side have conductors curved into the opposite tangential direction.

The shape of the winding overhangs can be semicircular, triangular or of some similar shape. In the ferromagnetic core 3 at first the conductor of the first phase 91 is inserted, then followed by the conductor of the second phase 92 and the conductor of the third phase at the end. All caverns 95 at the conductor of the first phase are on the upper side, so this is why it is enough if the conductors for the first phase 91 and the conductor for the third phase 93 are manufactured as identical or at least similar, but the conductor for the third phase 93 is then turned upside down when inserted into the ferromagnetic core. The conductor of the second phase 92 is shaped in such a way that the cavities 95 alternate from upper to bottom position. The situation for the crossings points 94 is similar. The winding 6 can comprise multiple layers 40.

The main advantage of the variant with deformed wave winding is in simplicity of its production. The drawback is in the requirement for plastic deformations or any other deformations of the conductors 8. These deformations can lead to the increase of electrical resistance. This winding can be used in three phase machines. In two phase machines the situation is similar; the difference is there is only one cavern 95 and crossing point 94 in winding overhang 11.

The winding overhangs 11 in the helical compact wave winding 6 are shaped in such a way that there one winding overhang 11 moves for one height of the conductor 8 in the radial direction between the straight part of the winding and the next winding overhang, which is on the other axial side, moves to the other radial direction. In this way, in one layer 40 all winding overhangs 11 are curved into the same tangential direction. The two layers 40 comprise 2 N conductors 8 and this double layer 17 has the height of approximately two conductor 8 heights.

Figure 10:
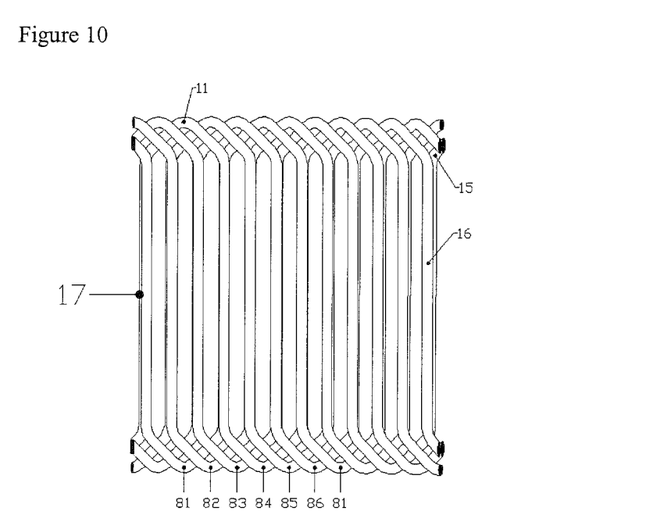

As shown in FIG. 10, every double layer 17 comprises two single layers of wave shaped conductors 8 of bottom layer 15 and upper layer 16. Six wave shaped conductors 8, namely the first conductor 81, the second conductor 82, the third conductor 83, the fourth conductor 84, the fifth conductor 85 and the sixth conductor 86 in three pairs of two conductors 8 belong to three electrical phases. Each phase comprises two symmetrical coils, for example the first coil comprises the first conductor 81 and the fourth conductor 84. These two conductors 8 are alternating their radial positions from bottom to top. The topological structure of all six conductors 8 in FIG. 10 represents the flat six helical form of the flatten tape. Since we deal with helical form, all curves are symmetrical, similar and fit well together in the limited space.

Figure 11:
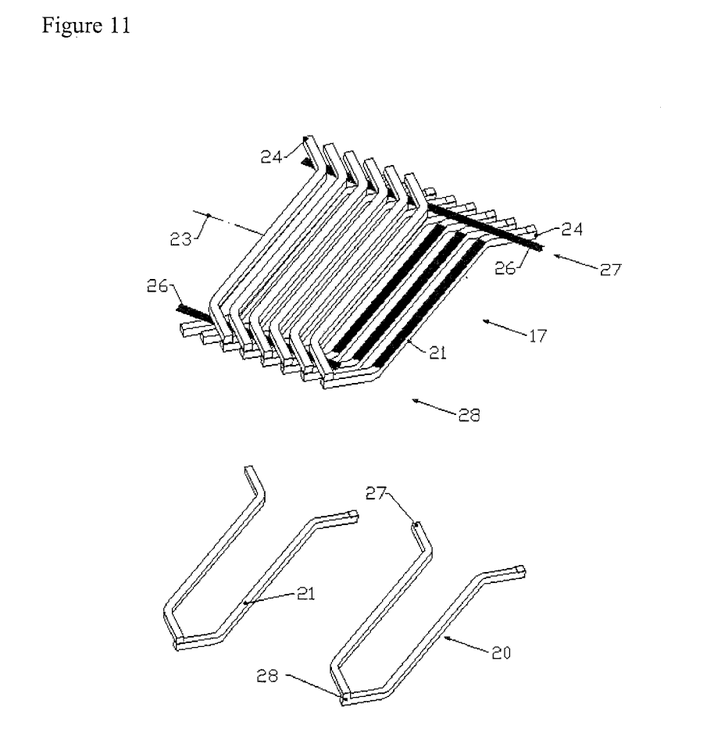

For the manufacturing of helical winding, all conductors 8 have to be shaped into the flatten tape or the double layer 17. FIG. 17 shows the alternative production method of double layer 17 where double layer comprise discrete sections. There are at least two possibilities. In the first version singular sections 21 are aligned into the row which represent bottom layer 15 of the winding. The upper layer 16 is similar, but rotated for 180° around the line 23 axis. The endings 24 of the segments 21 of the bottom layer 15 and the endings 24 of the upper layer 16 touch are in contact with each other. On these spots, the endings 24 are welded or connected with good electrical contact by other methods.

When producing the flatten tape it is important to make sure that only the endings 24 are in contact and not also the other parts of segments 21. This can be accomplished by having an additional insulation layer 26 between the segments 21.

FIG. 11 shows also an alternative version. Segments by this second version 20 are shaped in typical shape of this second version 20. One segment of the second version is made of one piece of copper or other material with good electrical conductivity. The shape of this second version segment 20 is the same as the two first version segments together. Welding points can be positioned only on one axial side of the motor and also the number of segments is half the number in the first version.

Double layer 17 of winding 6 can be inserted in one step into the ferromagnetic core. The complete winding can comprise of one or multiple double layers 17. Irregular magnetic periods can be used for easier creation of contacts or transitions between the layers 40. At higher voltages it makes sense to include additional electrical insulation between the layers 40.

The connections between the contacts can be produced in different ways, so that coil arrangements in star or triangle are possible. In addition, different series and parallel coil combinations are possible.

Conductors 8 or the layers 40 or the double layers 17 can be produced inside the ferromagnetic core 3 or can be produced outside and inserted into is in complete or partly complete form.

If the winding is produced by multiple thinner wires, which can be easily deformed into appropriate shape of winding overhangs 11, then by this procedure there is no need to create the radial deformations and crossing points, but multiple layers 40 can also be inserted and pressed together in order to get the required shape. By this method the necessary deformations are produced automatically. Similar methods for pressing multiple layers together are already known, but in the known versions, the winding overhangs are much longer since they can cross each other only in larger volume.

The invention is compact multiphase winding (6) of electric machine, especially for electric machines with high specific torque for direct drive applications. Winding (6) fills the slots (5) of the stator ferromagnetic core (3) and comprises of one or multiple layers (40). Winding comprises N or a multiple of N conductors (8) shaped or assembled in such a way that it includes straight segment (10) and winding overhangs (11). Between two neighboring straight segments of the same conductor (8) there are N teeth (4) and N−1 slots (5) or N+1 teeth (4) and N slots (5). Straight segments (10) of the conductors (8) are connected by winding overhangs which shape in tangential axial plane differs for less than one sixth of magnetic period (7) from ellipse shape with one axis equal to half of magnetic period (7) and other axis length between half and three quarters of magnetic period (7) length.

The number of slots (5) in each magnetic period differs by at most one to the number of phases N multiplied by two and M, which is the number of in series tangentially arranged conductors of the same phase and when the slots (5) are filled with straight segments (10) of conductors (8) of one phase. In stator ferromagnetic core (3) the maximum number of extra slots (5) and teeth (4) is 2 N or up to 2 N slots (5) or teeth (4) differ by tangential length.

Winding overhangs 11 are according to the pseudo helical implementation of the invention at the beginning of the winding overhangs (12) and at their end (14) deformed into one radial direction and in the middle (13) of it into the opposite radial direction. At the beginning (12) of the winding overhang (11) the conducting material is deformed for approximately half of the conductor (8) height into one radial direction, than for approximately the height of the conductor (8) into the opposite radial direction in the middle (13) of the winding overhang and again for approximately half of the conductor (8) height into the initial radial direction. In each winding (6) layer (40) the winding overhang (11) shape on one axial side is the mirror image of the winding overhang (11) at the other axial side. The winding overhang (11) shape of one layer is the mirror image of the winding overhang shape of the neighboring layer (40).

By the deformed shape version of the invention the winding overhang (11) on one half or on the one and another half of the winding overhangs (11) at the length of at least one and less than four conductor (8) width are shaped in such a way that they fill more than quarter and less than three quarters of conductor (8) height. The winding overhangs (11) of tangentially neighboring conductors (8) on each axial side from the slots (5) are leaded into the opposite tangential directions.

By helical version the winding overhang (11) on its passing from the two straight segments (10) moves to the other radial position for less than one of the half conductor (8) height and the next winding overhang moves into the opposite radial position for approximately the same distance.

The invention claimed is:

1. Compact multiphase wave winding of electric machine with high specific torque, which fills slots on ferromagnetic core, the compact multiphase wave winding comprising one or more layers, which fill the slots and consist of N or a multiple of N conductors, where N represents the number of motor phases and where each conductor is shaped or assembled in such a way, that the conductor consists of parallel straight sections and winding overhangs, where there are N teeth and N−1 slots or N+1 teeth and N slots and where straight sections of the conductor are connected by winding overhangs, shape of which in tangential plane differs for less than one sixth of magnetic period from ellipse shape with one axis equal to half of magnetic pole pair and other axis length between half and three quarters of magnetic pole pair length, and the winding overhangs are curved at the beginning and at the end in one radial direction and curved in the middle in the opposite radial direction, wherein the beginning and the end are the sections of said winding overhang located adjacent to the respective parallel straight segments that the winding overhangs connect, and the middle is the section of a winding overhang located between the sections at the beginning and the end thereof.

2. The compact multiphase wave winding according to claim 1, wherein the number of slots in each magnetic pole pair differs by at most one to the number of phases N multiplied by two and M, which is the number of in series tangentially arranged conductors of the same phase and when the slots are filled with straight segments of conductors of one phase wherein the slot width on the side facing the magnet has at least the width of conductors.

3. The compact multiphase wave winding according to claim 1, wherein the length of magnetic pole pair does not differ by more than 30% from the value $2\pi\sqrt{(g\,s)}$, where g is the radial wave winding dimension and s is the radial thickness of rotor magnets.

4. The compact multiphase wave winding according to claim 1, wherein the cross section shape of the conductor is circular, rectangular or any other shape, wherein the conductor can comprise either one thick or multiple thin wires and wherein material is copper or any other material with good electrical conductivity and wherein conductors or layers can be partly or completely produced in or outside of the ferromagnetic core.

5. The compact multiphase wave winding according to claim 1, wherein each phase comprises of M conductors placed tangentially in series wherein M can be larger than unity and where the winding topology shape is the same as winding according to claim 1, but with M times N phases.

6. The compact multiphase wave winding according to claim 1, wherein the ferromagnetic core has up to 2 N additional slots and teeth or that up to 2 N slots or teeth differ from other slots and teeth in tangential length for at most one half of the magnetic pole pair.

7. The compact multiphase wave winding according to claim 1, wherein the winding overhangs of N times M conductors placed in series tangentially on the same winding axial side turn into one tangential direction after leaving the slot and winding overhangs of next N times M following conductors placed in series tangentially turn into the other tangential direction.

8. The compact multiphase wave winding according to claim 1, wherein the winding overhangs shape on one axial side of the winding is the mirror image of the winding overhang shape at the opposite winding axial side in the same layer and wherein on the each winding axial side the winding overhangs shapes in one layer are mirror shapes of the neighboring layer.

9. The compact multiphase wave winding according to claim 1, wherein the coil of each phase in one layer comprise one or more conductors and the same conductor may be present in more than one layer.

10. The compact multiphase wave winding according to claim 1, wherein the tangential direction of conductor continuation stays the same or turns into the opposite direction at the conductors radial transition.

11. The compact multiphase wave winding according to claim 1, wherein that the winding overhangs are on one half or on the one and another half of the winding overhangs at the length of at least one and less than four conductor width is shaped in such a way that they fill more than quarter and less than three quarters of conductor height and that the winding overhangs of tangentially neighboring conductors on each axial side from the slots are led into the opposite tangential directions.

12. The compact multiphase wave winding according to claim 1, wherein the winding overhangs on its length between the straight segments of the conductor turns for less than one and a half conductor height in one radial direction and the next winding overhang in the tangential direction turns for the same distance into the opposite direction and where winding overhangs of the tangentially neighboring conductors of the same layer are led to the same tangential direction from the slots and one layer comprises 2 N or multiple of 2 N conductors with total radial thickness of less than three conductor heights.

* * * * *